United States Patent [19]

Wenzel et al.

[11] 4,292,226

[45] Sep. 29, 1981

[54] PROCESS FOR THE PRODUCTION OF AQUEOUS DISPERSIONS OR SOLUTIONS OF POLYURETHANE POLYUREAS, AND DISPERSIONS OR SOLUTION OBTAINABLE BY THIS PROCESS AND THEIR USE

[75] Inventors: Wolfgang Wenzel, Bergisch-Gladbach; Walter Meckel, Neuss, both of Fed. Rep. of Germany

[73] Assignee: Bayer Aktiengesellschaft, Leverkusen, Fed. Rep. of Germany

[21] Appl. No.: 78,542

[22] Filed: Sep. 24, 1979

[30] Foreign Application Priority Data

Oct. 6, 1978 [DE] Fed. Rep. of Germany ....... 2843790

[51] Int. Cl.³ .............................................. C08L 75/12
[52] U.S. Cl. ..................... 260/29.2 TN; 260/29.2 EP; 260/29.4 R; 260/29.6 NR; 428/423.4
[58] Field of Search .................. 260/29.2 TN; 528/61, 528/904, 46

[56] References Cited

U.S. PATENT DOCUMENTS

| 3,437,624 | 4/1969 | Dawn et al. | 260/29.2 TN |
|---|---|---|---|
| 3,479,310 | 11/1969 | Dieterich et al. | 260/29.2 |
| 3,499,872 | 3/1970 | Thoma et al. | 260/75 |
| 3,607,837 | 9/1971 | Reegen | 528/499 |
| 3,756,992 | 9/1973 | Dieterich | 260/77.5 Q |
| 4,094,842 | 6/1978 | Wenzel et al. | 260/29.2 TN |
| 4,108,814 | 8/1978 | Reiff et al. | 260/29.2 TN |
| 4,147,679 | 4/1979 | Scriven et al. | 260/29.4 R |

FOREIGN PATENT DOCUMENTS

| 1222253 | 8/1966 | Fed. Rep. of Germany . |
|---|---|---|
| 1495745 | 6/1969 | Fed. Rep. of Germany . |
| 2446440 | 4/1976 | Fed. Rep. of Germany . |
| 6401350 | 8/1964 | Netherlands . |
| 1516018 | 6/1978 | United Kingdom . |

OTHER PUBLICATIONS

D. Dieterich et al, Angew. Chem. 82, 53 (1970).

Primary Examiner—Theodore E. Pertilla
Attorney, Agent, or Firm—Gene Harsh; Lawrence S. Pope; Thomas W. Roy

[57] ABSTRACT

This invention relates to a new process for the production of aqueous dispersions or solutions of polyurethane-polyureas by reacting NCO-prepolymers which have been hydrophilically modified and/or which contain external emulsifiers with organic polyamines and/or hydrazines in the aqueous phase, the above-mentioned chain extenders - in the form of their solid adducts with inorganic or organic acids - being mixed with the NCO-prepolymers to form a suspension before production of the dispersion or solution. The invention also relates to the dispersions or solutions obtainable by this process and to their use for the production of coatings or bonds.

14 Claims, No Drawings

PROCESS FOR THE PRODUCTION OF AQUEOUS DISPERSIONS OR SOLUTIONS OF POLYURETHANE POLYUREAS, AND DISPERSIONS OR SOLUTION OBTAINABLE BY THIS PROCESS AND THEIR USE

BACKGROUND OF THE INVENTION

The production of stable, aqueous polyurethane-polyurea dispersions is known and is described for example in German Offenlegungsschrift Nos. 1,495,745; 1,770,068; 2,555,534; 2,446,440 and 2,543,091; U.S. Pat. Nos. 3,479,310; 3,756,992; 4,108,814 and 4,094,842; and D. Dieterich et al, Angew. Chem. 82, 53 (1970).

In this connection, a distinction has to be drawn between processes involving the use of solvents and so-called solvent-free processes.

In the first case, high molecular weight polyurethanes are synthesized by polyaddition in organic solution, i.e. in homogeneous phase, before they are dispersed in water. This process gives polyurethane films of particularly high quality which may even be used for coating textiles.

The disadvantage of this process lies in the poor volume/time yield which results from the large quantity of solvent required and which, in addition, has to be rectified after distillation.

In addition, the use of the organic solvent increases the danger of fire and explosions in the production plants.

Of the solvent-free processes, two are particularly worth mentioning, namely the so-called melt dispersion process which is described in German Offenlegungsschrift No. 1,770,068 and in U.S. Pat. No. 3,756,992, and the process described in German Offenlegungsschrift No. 2,446,440 and in U.S. Pat. No. 4,108,814 in which a prepolymer containing sulphonate and NCO-groups is reacted with diamine during or after dispersion, the reaction being accompanied by chain extension.

Whereas the melt dispersion process gives cross-linked polyurethanes the properties of which are inadequate for many applications, for example the coating of textiles, the process described in German Offenlegungsschrift No. 2,446,440 gives partly inhomogeneous polyurethane urea particles which can in turn lead to films with inadequate mechanical strength and, in some cases, inadequate resistance to hydrolysis. The reason for the inhomogeneity of the polyurethane ureas lies in the procedure adopted in German Offenlegungsschrift No. 2,446,440 which does not guarantee uniform dispersion of the diamine in the prepolymer containing NCO-groups before chain extension.

Accordingly, the object of the present invention is to provide a solvent-free or low-solvent process which makes it possible for polyurethane (ureas)s with improved properties to be produced in the aqueous phase, the improvement being derived in particular from the fact that the high molecular weight solid dispersed in the liquid aqueous medium is obtained by polyaddition in homogeneous phase.

This object is achieved by the process according to the invention as described in detail hereinafter.

SUMMARY OF THE INVENTION

The present invention relates to a process for the production of aqueous dispersions or solutions of polyurethane-polyureas by reacting prepolymers containing chemically incorporated hydrophilic groups and/or external, chemically non-bound emulsifiers and at least two free isocyanate groups with chain extenders in the aqueous phase, characterized in that (a) isocyanate-group-containing prepolymer modified by the incorporation of hydrophilic groups and/or containing external emulsifiers are mixed in liquid form and/or in solution in inert solvents in the absence of water with (b) solid adducts, insoluble in the prepolymers or their solutions, of
(ba) amines containing at least two primary and/or secondary amino groups and/or hydrazines containing at least one hydrogen atom on both nitrogen atoms and
(bb) inorganic or organic acids to form a suspension and the suspension thus formed is subsequently mixed with water.

The invention also relates to the dispersions or solutions obtainable by this process and to their use for coating or bonding flexible and non-flexible substrates.

DETAILED DESCRIPTION OF THE INVENTION

Starting materials a) suitable for use in the process according to the invention are NCO-prepolymers containing at least two terminal isocyanate groups. It is preferred to use difunctional NCO-prepolymers. The NCO-prepolymers used in the process according to the invention are preferably NOC-prepolymers which contain one or more hydrophilic groups responsible for their solubility or dispersibility in water. However, it is also possible to use basically hydrophobic NCO-prepolymers in the process according to the invention provided that provision is made for their solubility or dispersibility in water by the use of external emulsifiers. It is of course also possible to increase the hydrophilicity of NCO-prepolymers containing incorporated hydrophilic groups by the additional use of external emulsifiers.

The process according to the invention may be carried out with any NCO-prepolymers of the type hitherto used in the production of aqueous polyurethane dispersions or solutions. They are produced by known processes of the type described for example in the above-mentioned literature references relating to the production of aqueous polyurethane dispersions. Instead of using the hydrophilically modified NCO-prepolymers mentioned in these literature references, it is possible, as already mentioned, to use simple, non-ionically modified NCO-prepolymers in the process according to the invention provided that provision is made for their dispersibility or solubility in water by the use of suitable dispersion aids.

Accordingly, suitable starting materials for producing the NCO-prepolymers are: 1. Any organic polyisocyanates, preferably diisocyanates corresponding to the formula Q(NCO)$_n$ in which
n=2 or 3, preferably 2, and
Q represents a saturated aliphatic hydrocarbon radical containing from 2 to 18, preferably from 6 to 10 carbon atoms, a saturated cycloaliphatic hydrocarbon radical containing from 4 to 15, preferably from 6 to 10 carbon atoms, an aromatic hydrocarbon radical containing from 6 to 15, preferably from 6 to 13 carbon atoms or an araliphatic hydrocarbon radical containing from 8 to 15, preferably from 8 to 13 carbon atoms, at least 2 carbon atoms being arranged between the NCO-groups in each case.

Examples of suitable polyisocyanates, particularly diisocyanates, are tetramethylene diisocyanate, hexamethylene diisocyanate, dodecamethylene diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane (IPDI), 2,4- and 2,6-hexahydrotolylene diisocyanate and mixtures of these isomers, hexahydro-1,3- and/or 1,4-phenylene diisocyanate, perhydro-2,4'- and/or -4,4'-diphenyl methane diisocyanate, 1,3- and 1,4-phenylene diisocyanate, 2,4- and 2,6-tolylene diisocyanate and mixtures of these isomers, diphenyl methane-2,4'- and/or -4,4'-diisocyanate and, naphthylene-1,5-diisocyanate.

It is of course also possible to use mixtures of these isocyanates. Small quantities of mono- and triisocyanates may also be used. It is of course also possible to use the modified polyisocyanates known per se in polyurethane chemistry, i.e. polyisocyanates containing for example carbodiimide groups, allophanate groups, isocyanurate groups, urethane groups and/or biuret groups, in the process according to the invention, although this is not preferred.

Preferred polyisocyanates are hexamethylene diisocyanate, 1-isocyanato-3,3,5-trimethyl-5-isocyanatomethyl cyclohexane, diphenyl methane-4,4'-diisocyanate, 2,4- and 2,6-tolylene diisocyanate and mixtures thereof. 2. Any organic compounds containing at least two isocyanate-reactive groups, more particularly organic compounds containing a total of two amino groups, thiol groups, carboxyl groups and/or hydroxyl groups and having molecular weights in the range from about 61 to 10,000 and preferably in the range from about 300 to 4000. The corresponding dihydroxyl compounds are preferably used. The use of compounds with a functionality of three or higher in the isocyanate polyaddition reaction in small quantities in order to obtain a certain degree of branching is also possible, as is the above-mentioned possible use of trifunctional or more highly functional polyisocyanates for the same purpose.

Preferred hydroxyl compounds are the hydroxy polyesters, hydroxy polyethers, hydroxy polythioethers, hydroxy polyacetals, hydroxy polycarbonates and/or hydroxy polyester amides known per se in polyurethane chemistry. Suitable polyesters containing hydroxyl groups are, for example, reaction products of polyhydric, preferably dihydric and, optionally, trihydric alcohols with polybasic, preferably dibasic, carboxylic acids. Instead of using a free polycarboxylic acid, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic anc may be substituted, for example by halogen atoms, and/or unsaturated. Examples of polycarboxylic acids such as these are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, maleic acid anhydride, fumaric acid, dimeric and trimeric fatty acids, such as oleic acid, which may be used in admixture with monomeric fatty acids, terephthalic acid dimethylester, terephthalic acid-bis-glycol ester. Suitable polyhydric alcohols are for example, ethylene glycol, 1,2- and 1,3-propylene glycol, 1,4- and 2,3-butylene glycol, 1,6-hexane diol, 1,8-octane diol, neopentyl glycol, cyclohexane dimethanol-(1,4-bis-hydroxymethyl cyclohexane), 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example ε-caprolactone, or hydroxy carboxylic acids, for example ω-hydroxy caproic acid, may also be used.

The polyethers suitable for use in accordance with the invention, preferably containing two hydroxyl groups are also known per se and are obtained for example by polymerizing epoxides, such as ethylene oxide, propylene oxide, butylene oxide, tetrahydrofuran, styrene oxide or epichlorohydrin, on their own, for example in the presence of boron trifluoride, or by the addition of these epoxides, either in admixture or successively, with starting components containing reactive hydrogen atoms, such as alcohols and amines, for example water, ethylene glycol, 1,3- or 1,2-propylene glycol, 4,4'-dihydroxy diphenyl propane or aniline.

Polyethers modified by vinyl polymers of the type formed for example by polymerizing styrene, acrylonitirile in the presence of polyethers as described in U.S. Pat. Nos. 3,383,351; 3,304,273; 3,523,093; and 3,110,695 all incorporated herein by reference and German Pat. No. 1,151,536 are also suitable. The more highly functional polyethers which may also be proportionately used are similarly obtained in known manner by alkoxylating starter molecules of relatively high functionality, for example, ammonia, ethanolamine, ethylene diamine or sucrose.

Among the polythioethers, particular reference is made to the condensation products of the thiodiglycol on its own and/or with other glycols, dicarboxylic acids, formaldehyde, aminocarboxylic acids or aminoalcohols. Depending on the co-components, the products in question are polythio mixed ethers, polythio ether esters, polythio ether ester amides.

Suitable polyacetals are, for example, the compounds obtainable from glycols, such as diethylene glycol, triethylene glycol, 4,4'-diethoxy diphenyl dimethyl methane, hexane diol and formaldehyde. Polyacetals suitable for use in accordance with the invention may also be obtained by polymerizing cyclic acetals.

Suitable polycarbonates containing hydroxyl groups are known per se and may be obtained for example by reacting diols, such as 1,3-propane diol, 1,4-butane diol and/or 1,6-hexane diol, diethylene glycol, triethylene glycol, tetraethylene glycol, with diaryl carbonates, for example diphenyl carbonate, or phosgene.

The polyester amides and polyamides include for example the predominantly linear condensates obtained from polybasic saturated and unsaturated carboxylic acids or their anhydrides and polyhydric saturated and unsaturated amino alcohols, diamines, polyamines and their mixtures. Polyhydroxyl compounds already containing urethane or urea groups may also be used.

It is also possible to use low molecular weight polyols such as, for example, ethane diol, 1,2- and 1,3-propane diol, 1,4- and 1,3-butane diol, pentane diols, hexane diols, trimethylol propane, hexane triols, glycerol and pentaerythritol. Monofuntional alcohols, such as stearyl alcohol for example, may also be used in small quantities.

Representatives of the above-mentioned polyisocyanate and hydroxyl compounds suitable for use in the process according to the invention are described, for example, in High Polymers, Vol. XVI, "Polyurethanes, Chemistry and Technology" by Saunders-Frisch, Interscience Publishers, New York, London, Volume I, 1962, pages 32 to 42 and pages 44 to 54, and Volume II, 1964, pages 5 to 6 and 198 to 199, and also in Kunststoff-Handbuch, Volume VII, Vieweg-Hochtlen, Carl-Hanser-Verlag, Munich, 1966, for example on pages 45 to 71.

3. Synthesis components containing chemically fixed hydrophilic groups and preferably having a functionality of one and, more particularly, two in the isocyanate addition reaction of the type described by way of example in the above-mentioned literature references relating to the production of aqueous polyurethane dispersions or solutions, i.e. diisocyanates, diamines or dihydroxy compounds containing for example ionic or potential ionic groups and diisocyanates or glycols containing polyethylene oxide units. Preferred hydrophilically modified synthesis components are in particular, the aliphatic diols containing sulphonate groups according to German Offenlegungsschrift No. 2,446,440 and U.S. Pat. No. 4,108,814 incorporated herein by reference, the cationic or even anionic incorporable internal emulsifiers according to German Offenlegungsschrift No. 2,651,506 and U.S. patent application Ser. No. 849,690, filed November 8, 1977 and also the monofunctional incorporable polyethers described in this patent application. In the production of the NCO-prepolymers by methods known per se, the reactants are generally used in quantitative ratios corresponding to an equivalent ratio of isocyanate groups to NCO-reactive hydrogen atoms, preferably hydroxyl groups, of from about 1.05 to 10 and preferably from about 1.1 to 3.

The individual reactants may in general be added in any order. It is possible to mix the hydroxyl compounds and to add the polyisocyanate or even gradually to add the mixture of hydroxyl compounds or the individual hydroxyl compounds to the polyisocyanate component.

The NCO-prepolymers are preferably prepared in the melt at about 30° to 190° C. and preferably at about 50° to 120° C. The prepolymers may of course also be prepared in the presence of organic solvents, although one of the main advantages of the process according to the invention lies in the very fact that organic solvents do not have to be used. Suitable solvents, which may be used in quantities of up to about 30% by weight, based on the solids content, for example for reducing the viscosity of particularly high melting prepolymers, are for example, acetone, methylethyl ketone, ethylacetate, dimethyl formamide or cyclohexanone.

The nature of and the quantitative ratios between the starting materials used in the production of the NCO-prepolymers are preferably selected in such a way that the NCO-prepolymers (a) have an average NCO functionality of from about 1.8 to 2.2, preferably 2, (b) contain from about 0 to 200, preferably from about 0.1 to 100 and, more particularly, from about 0.5 to 50 milliequivalents of cationic or anionic incorporated groups per 100 g of solids, (c) contain from about 0 to 30% by weight, preferably from about 0.5 to 30% by weight, and more particularly, from about 1 to 20% by weight, based on the total weight of the prepolymer, of ethylene oxide units present within a polyether segment and incorporated laterally, terminally and/or inside the main chain, and (d) have an average molecular weight of from about 500 to 20,000, preferably from about 800 to 9000.

As already mentioned, preferred NCO-prepolymers are NCO-prepolymers which contain either ionic groups of the type mentioned in (b), i.e. in particular $-COO^-$, $-SO_3^-$ or $=N^+=$ groups, or non-ionic groups of the type mentioned in (c) or both ionic and non-ionic groups of the type mentioned above. It is also possible, however, to use in the process according to the invention NCO-prepolymers which have been produced without any of the hydrophilic synthesis components mentioned in 3, i.e., in which the content of the groups mentioned above in (b) and (c) amounts to 0. In cases where NCO-prepolymers such as these, which have the properties mentioned above in (a) and (d), are used, it is essential to use external emulsifiers when carrying out the process according to the invention. Suitable external emulsifiers are described for example by R. Heusch in "Emulsionen", Ullmann, Volume 10, pages 449–473, Weinheim, 1975. It is possible to use both ionic emulsifiers such as, for example, alkali and ammonium salts of long-chain fatty acids or long-chain aryl(alkyl)sulphonic acids, and also non-ionic emulsifiers such as for example, ethoxylated alkyl benzenes having an average molecular weight of from about 500 to 10,000.

These external emulsifiers are mixed thoroughly with the NCO-prepolymers before the process according to the invention is carried out. They are generally used in quantities of from about 1 to 30% by weight and preferably in quantities of from about 5 to 20% by weight, based on the weight of the NCO-prepolymer. Even in cases where hydrophilically modified NCO-prepolymers are used, it is readily possible to increase their hydrophilicity by the additional use of external emulsifiers such as these, although in general this is not necessary.

In addition to the NCO-prepolymers (a), adducts (b) which dissociates under the influence of water and release amines or hydrazines are used in the process according to the invention. These adducts are solid substances which in general have a melting point above about 30° C. An upper melting point limit is not critical to the workability of the process according to the invention. In general, however, the melting points are not above about 300° C. The only important requirement for the purposes of the invention is that the melting point of the adduct should be above the temperature of the NCO-prepolymer to be extended or that of its solution in order to guarantee a heterogeneous suspension of the adduct in the prepolymer or its solution. For the same reason, the suspension of the adduct in the prepolymer or its solution should not be homogenized by the action of heat because, in cases such as these, the prepolymer would be immediately crosslinked, making dispersion or dissolution in water impossible.

The adducts (b) are either salts of the amines or hydrazines mentioned by way of example in the following with the inorganic or organic acids mentioned by way of example in the following or adducts of the amines or hydrazines with carbon dioxide with the amines or hydrazines.

Starting components for the production of the adducts (b) are
(ba) any organic amines containing at least two primary and/or secondary amino groups or any hydrazines containing at least one hydrogen atom on both nitrogen atoms, and
(bb) any inorganic or organic acids which form solid, generally salt-like adducts with component (ba). Preferred amines (ba) correspond to the formula A (NHB)$_2$ in which A represents a saturated aliphatic hydrocarbon radical containing from 2 to 12, preferably from 2 to 6, carbon atoms, a saturated cycloaliphatic hydrocarbon radical containing from 4 to 15, and preferably from 6 to 10, carbon atoms, an aromatic hydrocarbon radical containing from 6 to 15, preferably from 6 to 13 carbon atoms or an araliphatic hydrocarbon radical containing from 7 to 13 carbon atoms, at least two carbon atoms being arranged between the two amino groups, and B represents hydrogen or an alkyl radical containing from 1 to 18 carbon atoms, preferably hydrogen. The corresponding water-soluble amines are particularly preferred. If the amines are insoluble in water and have a melting point lying above the dispersion temperature, a water-miscible solvent in which the amines are soluble should if possible be added to the polymer or, alternatively, dispersion should be carried out above the melting point of the amine.

Examples of particularly preferred amines are ethylene diamine, 1,2-propylene diamine, 1,3-propylene diamine, hexamethylene diamine, 1-amino-3,3,5-trimethyl-5-aminomethyl cyclohexane (IPDA), 1,4-diaminocyclohexane, 4,4'-diamino-dicyclohexyl methane, 2,4- and 2,6-tolylene diamine and mixtures thereof or 4,4'-diaminodiphenyl methane and mixtures of these amines.

It is of course also possible to use modified amines such as, for example, N-methyl diethylene triamine or sodium ethylene diamino-2-ethane sulphonate.

Instead of or in addition to the above-mentioned amines, it is also possible to use as component (ba) hydrazines containing at least 2 NH-groups such as, for example, hydrazines, methyl hydrazines, dodecyl hydrazines, N,N'-dimethyl hydrazine and dihydrates of these hydrazines.

Component (bb) is preferably formed by inorganic or organic acids with molecular weights of from about 44 to 300 which are preferably dibasic or polybasic, such as for example phosphoric acid, carbonic acid in the form of carbon dioxide, tartaric acid or oxalic acid. It is particularly preferred to use carbon dioxide, which reacts with the amines to form the corresponding solid carbamates, as component (bb). Apart from carbon dioxide, it is also possible to use acids which, where the dispersions or solutions according to the invention are used for coating or binding, lose their acid character without giving off any corrosive substance following removal of the water at the temperature normally used, i.e. at temperatures in the range from about 20° to 200° C. and preferably at temperatures of from about 50° to 150° C. Acids such as these are described for example in German Patent Application P No. 28 27 156.9, and U.S. Patent Application Ser. No. 48,557, filed June 14, 1978.

The adducts (b) are produced in known manner by reacting the reactants (ba) and (bb), preferably at room temperature at least about 0.5 and preferably from about 1 to 1.2 acid equivalents of component (bb) being used for each amine equivalent of component (ba). The reaction may be carried out in the absence of solvents, for example by introducing carbon dioxide into liquid diamine, or in the presence of solvents, particularly water-miscible solvents which may be inert or reactive to isocyanates. Suitable solvents are, for example, simple ketones or alcohols such as, for example, acetone, methylethyl ketone, methanol, ethanol or ethylene glycol. Solvents such as these are used in particular when small quantities of water are present in the reaction mixture, as in the case of hydrazine hydrate for example. In general, the starting components (ba) and (bb) are soluble in the above-mentioned solvents, although the same does not apply to the adduct formed from them. This makes it possible for the adduct to be separated by simple filtration. Where solvents which are monofunctional with respect to isocyanate groups are used, for example methanol or ethanol, it is of particular advantage to remove the solvent by intensively drying the adduct. The use of solvents having a higher functionality with respect to isocyanate groups, in particular a functionality of 2 such as ethylene glycol is particularly interesting for the commercial production of the salts because, in this case, quantitative removal of the solvent is not absolutely necessary and, in many cases, it is sufficient simply to filter the adduct precipitated under suction from the solvent suspension. The solvent remaining in the filter cake may also be used as reactant by suitably selecting the reaction conditions. In some cases, it may even be of advantage to add the salts to the prepolymer in suspension in isocyanate-reactive compounds, for example butane diol, although in this case isocyanate groups of the prepolymer always have to be present in an excess relative to the hydroxyl groups of the solvent.

Where the adducts (b) are produced as described above, the use of the particularly preferred liquid diamines always results in the formation of solid adducts which contain per equivalent of amino groups at least about 0.5 and preferably at least about one acid equivalent bound in salt-like form, i.e. in carbamate form where carbon dioxide is used. The adducts do not have to be neutral. Instead it is even possible to use basic or acid adducts, the acid adducts being preferred because basic compounds can easily act as trimerization catalyst for the isocyanate groups, although this danger is relatively slight in heterogeneous systems. Acid salts are formed in the production of the adducts when for example a polybasic acid, such as phosphoric acid, is used as component (bb) in such a quantity that the phosphoric acid is only partly neutralized (first neutralization step) by the component (ba).

For carrying out the process according to the invention, the powder-form adducts (b) are suspended in the NCO-prepolymer. In addition to the already mentioned external emulsifiers, the prepolymer may contain other additives, such as in particular solvents, dyes, levelling agents and other modifying components. These additives and, in particular, other plastics dispersions or solutions compatible with the dispersions or solutions according to the invention may be added to the dispersions according to the invention even after their production. Basically, it is also possible to use other "blocked" amines or hydrazines which form free amines or hydrazines under the influence of water.

"Blocked" amines or hydrazines such as these are described for example in German patent applications P Nos. 27 25 589; P 27 32 131; or P 28 11 148 or U.S. Patent Application Ser. Nos. 908,885; 921,285; and 17,017, filed May 24, 1978; July 3, 1978; and Mar. 2, 1979, respectively. It is possible to use "mixed-blocked" polyamines which are blocked by various blocking agents. For example, carbamate of hydrazones may be used.

Solvent-free liquid NCO-prepolymers are preferably used for preparing the suspensions. Where particularly high-melting NCO-prepolymers are used, it is of course possible to add organic solvents for reducing viscosity such as for example acetone, methylethyl ketone, ethylacetate, dimethyl formamide or cyclohexanone. However, the solvent should only be used in the quantity required to guarantee adequate stirrability of the NCO-prepolymer and not, as in earlier processes for producing polyurethane dispersions, in the quantity required for homogeneously dissolving the chain-extended polyurethane. In general, it is sufficient for the purposes of the invention to use the solvent in a quantity of up to about 30% by weight, based on the solids content of the prepolymer.

The suspension is generally prepared at a temperature in the range of from about $-20°$ to $+150°$ C., preferably at temperatures in the range from about 30° to 90° C., subject only to the proviso that the temperature should always be selected so that a heterogeneous system is present. Accordingly, the suspension always has to be prepared below the melting point of the adduct (b).

To prepare the suspensions, the reactants (a) and (b) are mixed in such quantitative ratios that the equivalent ratio (NCO-groups of the prepolymer): (free-NH-groups+—NH-groups blocked to form adducts) amounts to between about 4:1 and 1:2, preferably to between about 2:1 and 1:1.25 and, more particularly, between about 1.3:1 and 1:1.2. In cases where other "blocked" amines or hydrazines are used, as is in principle possible but is no way preferred, the quantity of component (b) according to the invention has to be reduced accordingly so that the total ratio of the isocyanate groups to the at least partly blocked amino groups lies within the above-mentioned ranges. Such other "blocked" amines or hydroazines may be used in a quantity which corresponds at most to 50 equivalent percent, based on the sum of all amine and/or hydrazine chain lengthening agents. Under normal conditions, the suspension thus produced remains stable over a relatively long period, i.e. for more than 1 hour. At temperatures considerably below the melting point of the adduct (b), the suspension may be stored for several days.

The next step in the process according to the invention is to mix the suspension thus obtained with water or any aqueous liquid systems. This step is generally carried out at a temperature in the range of from about 10° to 150° C. and preferably at a temperature in the range from about 40° to 90° C. using a standard mixer such as, for example, stirrers, impeller-type homogenizing machines, ultrasonic dispersion machines or screw machines. At temperatures above about 100° C., mixing is carried out under pressure. Instead of using pure water, it is also possible to use an aqueous system which already contains the auxiliaries and additives mentioned by way of example above. It is also possible to use aqueous solutions of free amine chain extenders, as described for example in German Offenlegungsschrift No. 2,446,440 and U.S. Pat. No. 4,108,814. However, amine chain extenders of this type are used in only small quantities, if at all.

Mixing of the suspension with the aqueous medium or water is accompanied by rapid homogenization of the heterogeneous mixture in which the corresponding amine or hydrazine (ba) is released through dissociation of the adduct (b) and reacts with the NCO-prepolymer in aqueous phase, accompanied by chain extension, while the acid (bb) leaves the aqueous phase in the form of gaseous carbon dioxide or dissolves in the water. In the production of cationically hydrophilically modified polyurethane dispersions or solutions, the acid released may also be used for neutralizing tertiary nitrogen incorporated in the NCO-prepolymer with formation of cationic groups responsible for the dispersibility of the high molecular weight polyurethane formed at the same time. In this case, there would be no need in the extreme case to use hydrophilically modified NCO-prepolymers or NCO-prepolymers containing external emulsifiers because the hydrophilic group is formed in situ.

In some cases, the readiness of the adducts (b) to dissociate in water is relatively poor. In cases such as these, for example where hydrazine carbamate which dissolves relatively slowly in water with elimination of carbon dioxide is used, it is possible to accelerate dissociation of the adduct by adding to the water or aqueous medium small quantities of acid stronger than acid (bb) present in the adduct. For example, where hydrazine carbamate is used as the adduct (b), it is sufficient to add a few parts per 1000 of phosphoric acid to the dispersion water in order sufficiently to accelerate the dissociation of the adduct.

The question of whether solutions or dispersions of the polyurethanes or polyurethane polyureas in water are obtained in the process according to the invention depends above all upon the molecular weight and the hydrophilicity of the dissolved or dispersed particles which may in turn be adjusted by suitable selection of the nature of and quantitative ratios between the starting materials, particularly in the production of the NCO-prepolymers (a) by the known methods of polyurethane chemistry. For example, the use of an NCO-prepolymer having an average NCO-functionality of slightly less than two results in termination of the polyaddition reaction before excessively high molecular weights are obtained.

The dispersions or solutions generally have a solids content of from about 5 to 60% by weight and preferably from about 25 to 50% by weight. The dispersions or solutions may also be subsequently diluted with water as required.

The dispersions generally remain stable against sedimentation for several weeks. The solid has a particle size of less than about 500 nm and preferably less than about 300 nm. In the case of aqueous solutions, there are generally no solid particles present. It is in principle, also possible to produce sedimenting dispersions with larger particles.

The dispersions produced by the process according to the invention may of course also be further modified in known manner, for example by admixture with other polyurethane and/or polymer latices, such as, for example, polyacrylate dispersions or by the addition of crosslinkers and/or hydrophobizing agents such as, for example, aldehydes, melamine resins, epoxides and monoisocyanates or polyisocyanates, which may also be present in masked form.

The process according to the invention makes it possible for polyurethane polyureas to be produced in the aqueous phase, and thus, is also a method of producing products which, on account of their hard-segment content, would precipitate in solvents. Hard products such as these open up new fields of application, particularly in the finish and lacquer section. In addition, dispersions produced by this process may be used as adhesives and coatings on flexible and non-flexible substrates, depending on the composition of the polyurethane. Thus, they may be used for example for dressing leather, for coating and finishing textiles, for coating paper and for lacquering wood, metal or plastics. Other interesting applications are for example the impregnation of foams and the sizing of glass fibers (size additives).

Production of the salt-like adducts (b) used in the Examples (all of the percentages quoted represent % by weight):

(A) In a 1 liter metal reaction vessel equipped with a helical stirrer, 200 g of ethylene glycol and 100 g of hydrazine hydrate are mixed and reacted with carbon dioxide under a pressure of 0.5 bar until no more carbon dioxide is taken up (approximately 2 to 3 hours). The suspension formed is filtered off through a vacuum filter. The filter cake is washed twice with acetone and carefully filtered through a vacuum filter. Hydrazine content: 42% (theoretical: 42.1%, expressed as $H_2N-NH_2xCO_2$)
m.p.: 89° C.

Instead of ethylene glycol, it is also possible to use other solvents and, in particular, alcohols such as, for example, methanol.

(B) 200 g of hydrazine hydrate and 100 ml of methanol are mixed in a 1 liter sulphonation pot. 461 g of 85% phosphoric acid are slowly added dropwise with cooling. The salt precipitate is filtered off through a vacuum filter, washed twice with 300 ml of acetone and carefully refiltered under suction.

Hydrazine content: 19.5% (theroetical: 24.6%, expressed as $H_2N-NH_2xH_3PO_4$)
m.p.: 115° C.

(C) 180.3 g of ethylene diamine are introduced into 400 ml of acetone while cooling with ice in a 3 liter sulphonation vessel. 309.7 g of 95% sulphuric acid are slowly added dropwise. The salt formed is washed twice with acetone and filtered off very carefully through a vacuum filter.

Solids: 100%
m.p.: <310° C.

(D) In a 1 liter sulphonation vessel 126 g of oxalic acid dihydrate are introduced into 250 g of methanol and neutralized by the gradual dropwise addition of 75 g of 80% ethylene diamine. The white solid is filtered off under suction, washed with methanol and dried in an oil pump vacuum.

Ethylene diamine content: 24% (theoretical: 40% expressed as $H_2N-(CH_2)_2-NH_2s(HOOC)_2$)
m.p.: 195° C.

(E) In a 5 liter sulphonation vessel, 876 g of adipic acid are suspended in 2000 g of methanol and neutralized by the dropwise addition with cooling and stirring of 360 g of ethylene diamine in 100 g of methanol. After stirring for 10 minutes, the solid is filtered off through a glass vacuum filter. The residue is washed three times with 1000 ml of acetone. The solid is carefully filtered off through a vacuum filter.

Ethylene diamine content: 28.2% (theoretical: 29.1%, expressed as $H_2N(CH_2)_2NH_2x\ HO_2C-(CH_2)_4-CO_2H$ m.p.: 165° C.

(F) 105 g of tartaric acid are dissolved in 210 g of methanol in a 1 liter sulphonation vessel. 89.2 g of hexamethylene diamine in 150 g of methanol are then added dropwise with stirring and cooling. The salt precipitated is filtered off through a glass vacuum filter, washed twice with methanol and subsequently dried in an oil pump vacuum. Hexamethylene diamine content: 35.1% (theoretical: 43.6%, expressed as

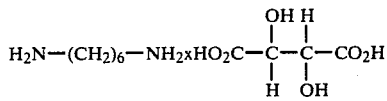

m.p.: 155° C.

(G) 200 g of hexamethylene diamine are introduced into a 1 liter metal reaction vessel equipped with a helical stirrer and preheated to 50° C. The amine is then reacted with carbon dioxide while stirring under a pressure of 0.5 bar until no more carbon dioxide is taken up. A dusty powder is formed.
m.p.: 133° C.

hexamethylene diamine content: 73% (theoretical 72.5%, expressed as $H_2N-(CH_2)_6-NH_2xCO_2$).

(H) The procedure is as in (G), except that the hexamethylene diamine is replaced by 200 g of isophorone diamine
(IPDA) which are reacted with carbon dioxide at 25° to 40° C. m.p.: 95° C.

IPDA-content: 80.5 (theoretical 79.4%, expressed as IPDA x $CO_2$).

(I) A mixture of 424.7 g of isophorone diamine and 1500 g of acetone are introduced into a 5 liter sulphonation vessel. 288 g of 85% phosphoric acid are added dropwise to the mixture with cooling and stirring. The salt precipitate is filtered off under suction and washed twice with 1000 ml of acetone. IPDA-content: 42.5% (theoretical 63.4%, expressed as $IPDAxH_3PO_4$)
m.p.: 285° C.
acetone content: 31.0%.

(J) 200 g of the adduct of formaldehyde and sulphur dioxide with N,N'-dimethyl urea (acid number 147) are dissolved in 80 g of water. 55 g of 4,4'-diaminodicyclohexyl methane ($H_{12}MDA$) dissolved in 110 g of methanol are added dropwise with cooling and stirring. The salt precipitated is filtered off. The filter cake is suspended twice in methanol and filtered off through a vacuum filter. The solid is dried in an oil pump vacuum.
m.p.: 98° C.

EXAMPLE 1

| | |
|---|---|
| P | 540.0 g of butane diol polyadipate (hydroxyl No. 50), |
| | 85.5 g of a bisphenol-A-started polypropylene glycol polyether (hydroxyl No. 197) |
| | 43.5 g of a butanol-started polypropylene polyethylene glycol polyether (molar ratio of propylene oxide to ethylene oxide = 17:83, hydroxyl No. 26) (dispersant) |
| | 63.6 g of an NaHSO$_3$—adduct with propoxylate butene diol (hydroxyl No. 261, 81.9% in toluene |
| | 210.3 g of hexamethylene diisocyanate (H) |
| | 22.1 g of hydrazine carbamate (adduct A) |
| | 61.2 g of isophorone diamine carbamate (adduct H) |
| | 1520.0 g of salt-free water. |

Procedure:

The polyol mixture P is dehydrated in vacuo with stirring for 30 minutes at 110° C., cooled to 80° C. and mixed with the isocyanate (H) at that temperature until an NCO-content of 6% is obtained (approximately 6 hours). The adducts A and H are then added and mixed for about 15 minutes at around 60° C. The dispersion water is then slowly added with rapid stirring.

A finely divided dispersion having an outflow time (Ford cup, 4 mm orifice) of 22.3 seconds for a solids content of 38.6% is obtained. The dispersion has a pH-value of 6. A film of this dispersion has a tensile strength of 21 MPa and an elongation at break of 685%. The film has a shore-A-hardness of 87.

EXAMPLE 2

337.5 g of butane diol polyadipate (hydroxyl No. 50)
31.7 g of an NaHSO$_3$-adduct of propoxylated butene diol (hydroxyl No. 261, 81.9% in toluene)
18.7 g of a butanol-started polypropylene polyethylene glycol polyether (molar ratio of propylene oxide to ethylene oxide=17:83, OH-number 26) (dispersant)
80.0 g of acetone
139.8 g of 4,4'-diphenyl methane diisocyanate (44)
13.3 g of hydrazine carbamate (adduct A)
791.0 g of salt-free water.

Procedure

The polyol mixture is dehydrated in vacuo with stirring for 30 minutes at 110° C. and cooled to 60° C. Acetone is then added, after which the mixture is stirred with diisocyanate (44) at around 60° C. until an NCO-value of 4.8% is obtained. The adduct A is then added, followed by stirring for 15 minutes. Thereafter the prepolymer is slowly dispersed with water with intensive stirring. The acetone is then removed by distillation. A non-sedimenting dispersion having a viscosity of 639 cP/25° C. for a solids content of 48.2% is obtained.

A film of this dispersion has a tensile strength of 31 MPa, an elongation at break of 850% and a Shore-A-hardness of 71.

EXAMPLE 3

P {
179.3 g of ethylene glycol/phthalic acid polyester (hydroxyl No. 288)
80.5 g of phthalic acid/adipic acid/ethylene glycol polyester (hydroxyl No. 64.1)
23.2 g of NaHSO$_3$—adduct with propoxylated butene diol (hydroxyl No. 261: 81.9% in toluene)
33.5 g of a butanol-started polypropylene polyethylene glycol polyether (molar ratio of propylene oxide to ethylene oxide = 17:83), (hydroxyl No. 26)
}
114.5 g of hexamethylene diisocyanate (H)
20.1 g of ethylene diamine adipate (adduct E)
1100.0 g of salt-free water (40° C.)
31.0 g of isophorone diisocyanate (IPDI)
76.7 g of formaldehyde (30% in water)
17.1 g of monoethylene glycol
1.4 ml of phosphoric acid (85% in water).

Procedure

The polyol mixture P is dehydrated in vacuo for 30 minutes at 110° C. The diisocyanate (H) is added at 80° C. The mixture is stirred at this temperature until an NCO-content of 2.4% is obtained. The melt is cooled to 60° C. and mixed with the adduct E. After stirring for 15 minutes, the mixture is dispersed with water, the phosphoric acid being slowly added. The dispersion is cooled with stirring to room temperature. The IPDI is then added. After stirring for 3 hours at 25° to 30° C., formaldehyde is added and the mixture stirred for another hour at 55° C. After cooling to room temperature, monoethylene glycol is stirred in.

A very finely divided dispersion showing a Tyndall effect in transmitted light is obtained. The dispersion has an outflow time (4 mm orifice, Ford cup) of 13.1 seconds for a solids content of 35.9% and a pH-value of 6.

The dispersion is suitable for use as a leather dressing. The film has a Shore-A-hardness of 76.

EXAMPLE 4

P {
180.6 g of ethylene glycol/phthalic acid polyester (hydroxyl No. 288)
80.5 g of phthalic acid/adipic acid/ethylene glycol polyester (hydroxyl No. 64.1)
32.5 g of a butanol-started polypropylene polyethylene glycol polyether (molar ratio of propylene oxide to ethylene oxide = 17:83), (hydroxyl No. 26)
15.5 g of an NaHSO$_3$—adduct with propxylated butane diol (hydroxyl No. 261; 81.9% in toluene)
}
112.1 g of hexamethylene diisocyanate
15.2 g of ethylene diamine oxalate (adduct D)
1080.0 g of salt-free water
30.2 g of isophorone diisocyanate
75.1 g of formaldehyde (30% in water)
0.2 g of phosphoric acid (85% in water).

Procedure: of Example 3

A finely divided dispersion having an outflow time (4 mm orifice, Ford cup) of 12.5 seconds for a solids content of 29.4% is obtained. The dispersion has a pH-value of 3.5.

EXAMPLE 5

The recipe is as in Example 4, except that 13.3 g of ethylene diamine sulphate (adduct C) are used instead of ethylene diamine oxalate. No phosphoric acid is used.

The finely divided dispersion obtained has an outflow time (4 mm orifice, Ford cup) of 11.3 seconds for a solids content of 29.2%. The dispersion has a pH-value of 6.

EXAMPLE 6

The recipe and procedure are as in Example 4, except that 19.9 g of hexamethylene tartrate (adduct F) are used instead of ethylene diamine oxalate.

The dispersion obtained shows a Tyndall effect in transmitted light and has an outflow time (4 mm orifice, Ford cup) of 12 seconds for a solids content of 29.3%. The dispersion has a pH-value of 4.9.

EXAMPLE 7

{
180.6 g of ethylene gylcol/phthalic acid polyester (hydroxyl No. 288)
80.5 g of phthalic acid/adipic acid/ethylene glycol polyester (hydroxyl No. 64)
32.8 g of a butanol-started polypropylene polyethylene glycol polyether (molar ratio of propylene oxide to ethylene oxide = 17:83), (hydroxyl No. 26)
15.8 g of an NaHSO$_3$—adduct with propoxylated butene -continued diol (hydroxyl No. 261; 81.9% in toluene)
112.2 g of hexamethylene diisocyanate
24.0 g of isophorone diamine phosphate (adduct I)
1100.0 g of salt-free water
30.8 g of isophorone diisocyanate
76.7 g of formaldehyde (30% in water).

Procedure: of Example 3

A dispersion which shows a Tyndall effect in transmitted light is obtained. The dispersion has an outflow time (4 mm orifice, Ford cup) of 11.4 seconds for a solids content of 28.8% and a pH-value of 5. After drying at room temperature, a film of this dispersion has a tensile strength of 15 MPa, an elongation at break of 500% and a Shore-A-hardness of 87. The dispersion is suitable for dressing leather.

EXAMPLE 8

270.0 g of butane diol polyadipate (hydroxyl No. 50)
45.8 g of an NaHSO$_3$-adduct with propoxylated butene diol (hydroxyl No. 261; 81.9% in toluene) (A)
52.3 g of hexamethylene diisocyanate (H)
11.8 g of hexamethylene diamine carbamate (adduct G)
555.0 g of salt-free water
1.2 g of 85% phosphoric acid.

Procedure

Butane diol adipate and adduct (A) are dehydrated in vacuo with stirring for 30 minutes at 120° C., subsequently cooled to 70° C., mixed with the diisocyanate (H) and stirred at 80° C. until an NCO-content of 2.4% is obtained (approximately 3 hours). The adduct G is then added, followed by stirring for 15 minutes at 60° to 70° C. The mixture is then dispersed at 60° C. with water heated to 40° C., the phosphoric acid being added after about 100 ml of water.

A finely divided dispersion having an outflow time (4 mm orifice, Ford cup) of 65 minutes for a solids content of 39.2% and a pH-value of 6.

EXAMPLE 9

200.0 g of adipic acid/phthalic acid/ethylene glycol polyester (hydroxyl No. 64.1)
109.6 g of diethylene glycol polyadipate (hydroxyl No. 41)
195.4 g of hexamethylene diisocyanate (H)
230.0 g of acetone
73.9 g of N-methyl diethanolamine (N-MDA)
96.0 g of ethylene diamine phosphate (ADA-phosphate)
37.8 g of dimethyl sulphate
1040.0 g of water.

Procedure

The two polyesters are dehydrated in vacuo with stirring for 30 minutes at 120° C., cooled to 80° C. and stirred with the diisocyanate (H) until an NCO-content of 16.6% is obtained (approximately 30 minutes). Acetone is added and, after 10 minutes, the (N-MDA) is stirred in. The mixture reacts for 30 minutes at around 50° C. The ADA-phosphate and the dimethyl sulphate are then successively added. After stirring for about 40 minutes, the mixture is dispersed with water. The acetone is distilled off.

A very finely divided dispersion having a viscosity of 1100 cP for a solids content of 41.5% is obtained. The dispersion has a pH-value of 4.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of stable aqueous dispersions or solutions of polyurethanepolyureas by reacting in the aqueous phase prepolymers containing at least two free isocyanate groups and chemically incorporated hydrophilic groups or external chemically non-bound emulsifiers or both with chain-extending agents characterized in that
   (a) isocyanate-group-containing prepolymers modified by the incorporation of hydrophilic groups or containing external emulsifiers or both are mixed in liquid form or in solution in inert solvents in the absence of water with
   (b) solid adducts, insoluble in the prepolymers or their solutions, of
      (ba) amines containing at least two primary or secondary amino groups or hydrazines containing at least one hydrogen atom on both nitrogen atoms and
      (bb) inorganic or organic acids to form a suspension and the suspension thus formed is subsequently mixed with water.

2. A process as claimed in claim 1, characterized in that adducts (b) which, for each =NH-group, contain at least about 0.5 acid equivalents bound to form an adduct are used.

3. A process as claimed in claims 1 or 2, characterized in that the quantitative ratios between components (a) and (b) are selected in such a way that the equivalent ratio between isocyanate groups of the prepolymer and NH-groups, both free and blocked by formation of the adduct, amounts to between about 4:1 and 1:2.

4. A process as claimed in claims 1 or 2, characterized in that carbon dioxide is used as component (bb).

5. Aqueous dispersions or solutions obtainable in accordance with claims 1 or 2.

6. In a process for coating a substrate with aqueous polyurethane-polyurea solutions or dispersions, the improvement comprising coating said substrate with aqueous polyurethane-polyurea solutions or dispersions produced by the processes of claims 1 or 2.

7. A process for the production of an aqueous solution or stable aqueous dispersion of a polyurethanepolyurea comprising mixing in the absence of water
   (a) a hydrophilic NCO-prepolymer containing no more than about 30 wt. %, based on the weight of NCO-prepolymer, of inert solvent and having
      (aa) an average isocyanate functionality of from about 1.8 to 2.2,
      (ab) an average molecular weight of from about 500 to 20,000 and
      (ac) its hydrophilic properties contributed by dispersing centers selected from the group consisting of chemically incorporated cationic or anionic groups present in said NCO-prepolymer in from about 0.1 to 100 milliequivalents per 100 g of NCO-prepolymer, chemically incorporated ethylene oxide units present in said NCO-prepolymer in from about 0.5 to 30% by weight, based on the weight of the NCO-prepolymer, and external emulsifiers present in about 1 to 30% by weight, based on the weight of the NCO-prepolymer, with (b) a solid adduct which is insoluble in said NCO-prepolymer, or its solution has a melting point in excess of about 30° C. and dissociates under the influence of water to release amines or hydrazines, said adducts being the reaction product of (ba) an amine containing at least two amino groups which are either primary or secondary or a hydrazine containing at least one hydrogen atom on each nitrogen atom, and (bb) at least about 0.5 equivalents per amine equivalent of an organic or inorganic acid with a molecular weight between about 44 and 300, to form a suspension of said solid adduct in said NCO-prepolymer, and subsequently mixing said suspension with water whereby chain extension of component (a) takes place in the aqueous phase.

8. The process of claim 7, wherein said solid adduct is the reaction product of at least one equivalent of acid per equivalent of amine.

9. The process of claim 7, wherein the acid loses its acid character without giving off any corrosive substances on exposure in the absence of water to temperatures between about 20° and 200° C.

10. The process of claim 9, wherein the acid is carbon dioxide.

11. An aqueous polyurethane-polyurea dispersion produced by the process of claim 7 having a particle size less than about 300 nm.

12. In the process for bonding substrates with aqueous polyurethane-polyurea solutions or dispersions the improvement comprising bonding said substrates with aqueous polyurethane-polyurea solutions or dispersions produced by the process of claim 1 or 2.

13. The process of claim 1 or 7 wherein the product is an aqueous solution.

14. The process of claim 1 or 7 wherein the product is an aqueous dispersion.

* * * * *